US008006401B1

(12) United States Patent
Shapiro

(10) Patent No.: US 8,006,401 B1
(45) Date of Patent: Aug. 30, 2011

(54) CUT-OUT TOOL FOR MAKING A UTILITY RECEPTACLE CUT-OUT IN SHEETING MATERIAL

(76) Inventor: Allan Shapiro, North Adams, MA (US)

( * ) Notice: Subject to any disclaimer, the term of this patent is extended or adjusted under 35 U.S.C. 154(b) by 235 days.

(21) Appl. No.: 12/288,830

(22) Filed: Oct. 23, 2008

Related U.S. Application Data

(60) Provisional application No. 61/000,045, filed on Oct. 23, 2007.

(51) Int. Cl.
*G01B 1/00* (2006.01)
(52) U.S. Cl. ...................... 33/528; 33/DIG. 10
(58) Field of Classification Search .............. 144/144.1, 144/144.51, 144.52, 145.1, 371, 372; 33/528, 33/262, DIG. 10
See application file for complete search history.

(56) References Cited

U.S. PATENT DOCUMENTS

| | | | | |
|---|---|---|---|---|
| 3,823,754 A | * | 7/1974 | Nix | 144/372 |
| 3,924,331 A | * | 12/1975 | Goosen | 30/366 |
| 3,950,857 A | | 4/1976 | Zanavich | |
| 4,202,388 A | * | 5/1980 | Wieting | 144/353 |
| 4,285,135 A | | 8/1981 | Minozzi, Jr. | |
| 4,335,511 A | * | 6/1982 | Bowling | 30/366 |
| 4,359,302 A | * | 11/1982 | Payne | 409/84 |
| 4,802,284 A | * | 2/1989 | Jackson | 33/528 |
| 4,907,711 A | | 3/1990 | Stuchlik, III | |
| 5,012,043 A | | 4/1991 | Seymour | |
| 5,143,490 A | | 9/1992 | Kopras | |
| 5,222,303 A | | 6/1993 | Jardine | |
| 5,639,991 A | * | 6/1997 | Schuette | 174/58 |
| 6,055,736 A | * | 5/2000 | Gaston | 33/528 |
| 6,226,882 B1 | * | 5/2001 | Barr | 33/528 |
| 6,403,883 B1 | | 6/2002 | Morgan et al. | |
| 6,511,269 B1 | | 1/2003 | Smasne | |
| 6,558,190 B1 | | 5/2003 | Pierson, Jr. | |
| 6,810,598 B2 | | 11/2004 | Boys | |
| 6,842,993 B1 | * | 1/2005 | DiMauro | 33/528 |
| 6,986,210 B1 | | 1/2006 | Conway | |
| 7,334,342 B1 | * | 2/2008 | Barr et al. | 33/528 |

* cited by examiner

*Primary Examiner* — David J. Walczak
*Assistant Examiner* — Jennifer Chiang
(74) *Attorney, Agent, or Firm* — Malcolm J. Chisholm, Jr.

(57) ABSTRACT

The cut-out tool (10) includes an insert adaptor (22) configured to insert into and be secured within a utility receptacle (12) prior to sheeting material (16) overlying the receptacle (12), such as an electric receptacle (12). The insert adaptor (22) defines a mounting sleeve (30), and whenever the sheeting material (16) is secured over the receptacle (12) and insert (22), an insert hole (84) is cut adjacent and around an interior perimeter of the mounting sleeve (30). A mounting post (34) of an exterior template (32) is then secured within the mounting sleeve (30), and the exterior template (32) defines a cutting slot (42) that is dimensioned to contiguously and substantially overlie an exterior perimeter (28) of the receptacle (12). A cut is them made through the cutting slot (42) to define a template hole (86), and the sheeting material (16) then slides over the receptacle (12).

12 Claims, 5 Drawing Sheets

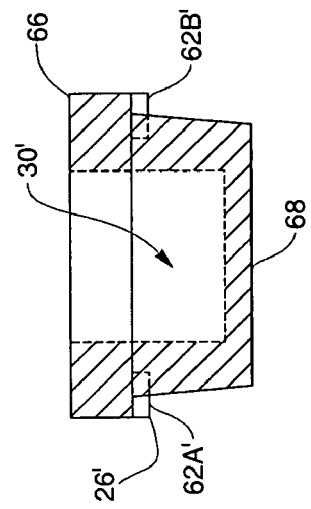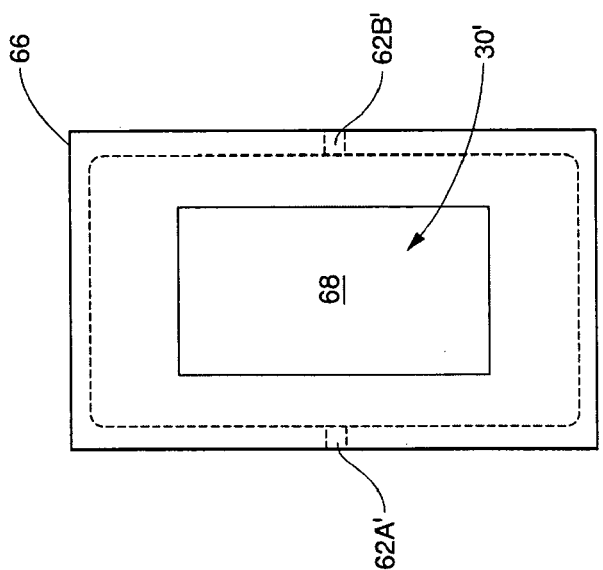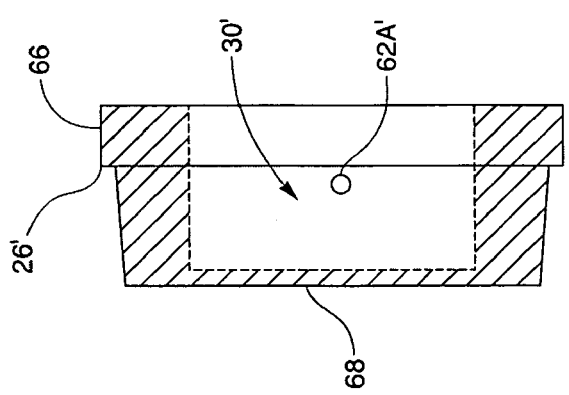

CUT-OUT TOOL FOR MAKING A UTILITY RECEPTACLE CUT-OUT IN SHEETING MATERIAL

CROSS REFERENCE TO RELATED APPLICATION

This Application claims the benefit of U.S. Provisional Patent Application Ser. No. 61/000,045 that was filed on Oct. 23, 2007, entitled "Cut-Out Tool For Making A Utility Receptacle Cut-Out In Sheeting Material".

TECHNICAL FIELD

The present invention relates to tools for facilitating making holes referred to as cut-outs in sheeting material such as "sheet rock" or "dry wall", etc., and more particularly relates to a tool for efficiently making a precise cut-out around a utility receptacle.

BACKGROUND ART

It is known in the building field that constructing both residential and commercial structures involves erecting a frame of support structures or studs that define walls and ceilings, etc. Plumbing conduits and electrical lines are then passed along and through the studs, and the electrical lines typically extend into electrical receptacles that provide outlets, control switches, lighting fixture connections, etc. The electrical receptacles take various shapes depending upon whether they serve as outlets, switches for one, two or more switches, etc. The receptacles are typically made of either metal or plastic materials that form a plurality of interconnected walls to define a receptacle chamber between the walls, and within which the electrical wires run to connect to outlets, switches, etc. The vast majority of electrical receptacles, however, take the form of a rectangular box dimensioned to support two outlets or two switches.

After the box-like electrical receptacles are secured to the support studs, sheeting material is secured to the studs to form wall or ceilings, etc. The sheeting material is typically a manufactured material commonly referred to by the generic terms "sheet rock" or "dry wall". When the sheeting material is applied to the wall, the electric receptacles are covered over. Common practice is to measure the location of an electrical receptacle by its height above a floor and distance from a secured section of sheeting material or support stud, and to then mark that on the next section of material. Then, when that sheet is secured to the wall, a hole is made at the mark of the expected location of the receptacle chamber, and an electric drill-like tool referred to as a router cuts out a section of the sheeting material adjacent the receptacle chamber. Then, a router operator moves the cutting bit of the router through the sheeting material beyond and adjacent a peripheral edge of the interconnected walls of the electrical receptacle. Next, the operator applies pressure to the router bit against an exterior of the interconnected walls of the receptacle and traces the exterior walls completely around the receptacle from a place of beginning back to the place of beginning, surrounding the receptacle. This results in another section of the sheeting material being cut out to define a receptacle receiving hole or receptacle cut-out in the sheeting material, and the hole is just beyond the peripheral edge of the receptacle so that the sheeting material may then slide over the receptacle.

The receptacle is positioned adjacent the support stud so that once the sheeting material is secured around the receptacle, screw holes within the receptacles are positioned to receive switch or outlet plate securing screws so that a switch plate or outlet plate may be secured to the receptacle to fit snuggly against the sheeting material, over the receptacle.

When applying such sheeting material to electrical receptacles, it is quite common for the material to chip and tear at corners of the receptacle, or for the router to move away from the edge of the receptacle leaving unsightly gouges and distortions in the sheeting material that extend beyond a peripheral edge of the switch or outlet plate. Such imperfections require application of a soft, pliable bonding-fill material referred to commonly as "spackle", etc. The fill material must be applied, dried and sanded, as is well known. Applying a fill material and then waiting for it to dry and be sanded, then sometimes painted, etc. takes an inefficient amount of time, and increases the labor costs of applying the sheeting materials.

Many efforts have been made to eliminate the problem of gouges and similar imperfections forming in sheeting material applied around electrical receptacles. For example, in U.S. Pat. No. 6,511,269 that issued on Jun. 28, 2003 to Smasne, an insert is shown that fits into the receptacle chamber and includes a spike that extends out of the insert. Upon application of a sheeting material over the insert, the spike is supposed to pass through the sheeting material as an efficient locator. Then a router cuts around the spike and traces the inside of the insert, and then the outside of the insert. The insert is then removed. Similarly, U.S. Pat. No. 6,403,883 that issued on Jun. 11, 2002 shows another insert with a spike, and the insert includes a shoulder that overlies the peripheral edge of the receptacle walls. However, it is believed that application of a heavy sheeting material to a wall necessarily involves movement of the sheeting material parallel to a plane defined by the wall or ceiling. Such lateral movement would necessarily damage the spikes of the aforesaid patent disclosures and would also very likely dislodge the inserts from their correct positions within the receptacles. Additionally, manufacturing receptacle inserts with long protruding spikes presents substantial cost challenges, and using them raises significant worker safety issues. Therefore, the cut-out tools of the described patent disclosures, and all other known cut-out facilitating tools, have failed to gain widespread acceptance.

Accordingly, there is a need for a cut-out tool for making an electrical receptacle cut-out that overcomes the deficiencies of prior art tools.

SUMMARY OF THE INVENTION

The invention is a cut-tool for making a utility receptacle cut-out in sheeting material that is to be secured to a structural support stud to which the utility receptacle, such as an electrical receptacle is secured. The receptacle includes a plurality of interconnected walls defining a receptacle chamber between the walls.

The cut-out tool includes an insert adaptor having a plurality of insert walls configured to be inserted into the receptacle chamber adjacent the interconnected receptacle walls. The insert adaptor defines a mounting shoulder that is secured to the insert walls and is configured to overlie a perimeter edge of the electrical receptacle to prevent the insert adaptor from passing completely into the receptacle chamber. The mounting shoulder also defines a mounting sleeve between the mounting shoulder and insert walls.

The cut-out tool also includes an exterior template that has a mounting post configured to extend beyond a mounting surface of the template a distance greater than a thickness of the sheeting material. The mounting post is configured to be received and secured by the mounting sleeve of the insert adaptor. The template also includes a cutting surface apposed to the mounting surface of the template, and the cutting surface defines a cutting slot passing completely through the template. The cutting slot is configured so that, whenever the mounting post of the template is secured within the mounting sleeve of the insert adaptor, the cutting slot substantially and contiguously overlies at least one-half of an exterior perimeter of the electrical receptacle.

In use of the present cut-out tool, prior to securing the sheeting material to the support stud, the insert adaptor is secured within a utility receptacle that the sheeting material is to overlie and then an approximate position of the receptacle under the sheeting material is marked on the sheeting material. Then, after the sheeting material is secured to the support stud and overlies the receptacle, an insert hole is cut at the marked location on the sheeting material, and the insert hole is expanded so that a perimeter of the insert hole is adjacent a perimeter of the mounting sleeve within the insert adaptor. Then, the mounting post of the exterior template is secured within the mounting sleeve so that the mounting surface of the template abuts the sheeting material over the receptacle. Then, a template hole is cut in the sheeting material adjacent the cutting slot defined within the cutting surface of the exterior template. The template may be pulled out of the insert adaptor, rotated one-hundred and eighty degrees, and then re-inserted into the insert adaptor, so that the cutting slot then overlies a portion of the exterior perimeter of the utility receptacle that has not yet been cut. The template hole is then completed by cutting along the cutting slot so that the template hole in the sheeting material completely, contiguously and substantially overlies the exterior perimeter of the utility receptacle. This allows the sheeting material to move over the utility receptacle to abut the support stud.

Typically, the utility receptacle is positioned on the support stud so that it projects away from the stud in a direction of the sheeting material a distance that is not quite as thick as the sheeting material, so that switch plates and outlet plates secured to the receptacles may securely abut the sheeting material.

The exterior template may then be removed from the insert adaptor, which allows for removal from the sheeting material of the section of the sheeting material that defines the template hole. The insert adaptor may then be removed and utilized again in other utility receptacles. Experimental work with the cut-out tool of the present invention demonstrates that the tool persistently produces cut-outs with perimeters that appear to be produced by automated machines. Preferred tools to utilize with the present cut-out tool include routers commonly utilized to produce cut outs in standard "sheet rock" or "dry wall" types of materials. The present cut-out tool is also capable of being utilized in producing precise cut-outs in any known sheeting material used to form walls, ceilings, etc.

In alternative embodiments of the present cut-out tool, the insert adaptor may include pivot pins protruding below the mounting shoulder and dimensioned to rest upon the perimeter edge of the utility receptacle about mid-way between a top and bottom of the receptacle to thereby define a pivot axis for the insert adaptor. The pivot axis would be about parallel to a plane defined by surfaces of the sheeting material, and parallel to a mounting axis that represents the point of initial attachment of the sheeting material to the support stud. For example, if the support stud is a vertical frame stud in a standard wall, and the sheeting material is first secured to a very top of the stud so that the sheeting material extends from the top downward and over the utility receptacle, then the mounting axis would be perpendicular to a top of the stud.

The pivot pins therefore allow the insert adaptor to pivot within the receptacle chamber so that the mounting shoulder of the insert adaptor is thereby flush to the interior surface of the sheeting material. This prevents any gaps between the mounting shoulder and the sheeting material when the router cuts the first hole. Similarly, when the exterior template is secured within the mounting sleeve, the pivot pins insure that the mounting surface of the exterior template is flush to the exterior surface of the sheeting material, to again prevent any formation of any gaps between the sheeting material and the template. This assures that the template hole will be formed by a clean cut into the sheeting material with no gouges, tears, etc.

In an additional alternative and preferred embodiment, the mounting post of the exterior template may be pivotally secured to the mounting surface of the exterior template. This would enhance efficiencies by obviating any need to pull the exterior template out of the insert adaptor when the template hole is only half cut. Pulling the exterior template out of the insert adaptor raises a slight risk of damaging delicate forms of sheeting material. By simply pivoting the cutting surface one-hundred and eighty degrees about a plane parallel to a plane defined by the sheeting material after making a first cut through the cutting slot, and then making a second cut through the cutting slot after rotation or pivoting of the cutting surface, the template hole will be made with virtually no risk of damage to the sheeting material. In the pivoting mounting post embodiment, the exterior template may include an alignment guide to make sure the rotation is exactly one-hundred and eighty degrees. The alignment guide may be matched lines, or may include an alignment guide spring and ball within an alignment cylinder within the mounting post configured so that the alignment spring forces an alignment ball into one of two alignment recesses defined within the mounting surface of the exterior template, wherein the alignment recesses are defined at one-hundred and eighty degrees from each other.

In another alternative embodiment, the insert adaptor may define a mounting sleeve that includes a base so that the insert adaptor is closed. This prevents any possibility of damage to any wires or other utilities within the receptacle as a router is extending into the mounting sleeve to cut the first hole.

In further alternative embodiments, the cutting slot defined within the exterior template may be defined to overlie screw-holes extensions within the exterior perimeter of a utility receptacle. For example, it is generally known that metal utility receptacle boxes include screw-hole extensions at a top and bottom of the receptacles. The cutting slot may define similar extensions so that the cutting slot overlies the extensions. In contrast, plastic utility receptacles include such screw holes within the receptacle chambers, so that the cutting slot within the exterior template need not define such extensions. The cut-out tool therefore may include as a package, one insert for both metal and plastic utility receptacles, while the package includes separate exterior templates that mate with the one insert, wherein one template would be for plastic receptacles and the other for metal receptacles.

Consequently it is a general purpose of the present cut-out tool for making a utility receptacle cut out in sheeting material that overcomes the deficiencies of the prior art by facilitating the making of precise cut-outs quickly with a very low cost tool.

These and other purposes and advantages of a cut-out tool for making a utility receptacle cut-out in sheeting material will become more readily apparent when the following description is read in conjunction with the accompanying drawing.

BRIEF DESCRIPTION OF THE DRAWINGS

FIG. 5A is a side plan view of a closed insert adaptor of the present invention.

FIG. 5B is a front, plan view of the FIG. 5A closed insert adaptor.

FIG. 5C is an end, plan view of the FIG. 5A closed insert adaptor.

DESCRIPTION OF THE PREFERRED EMBODIMENTS

Figure 1:
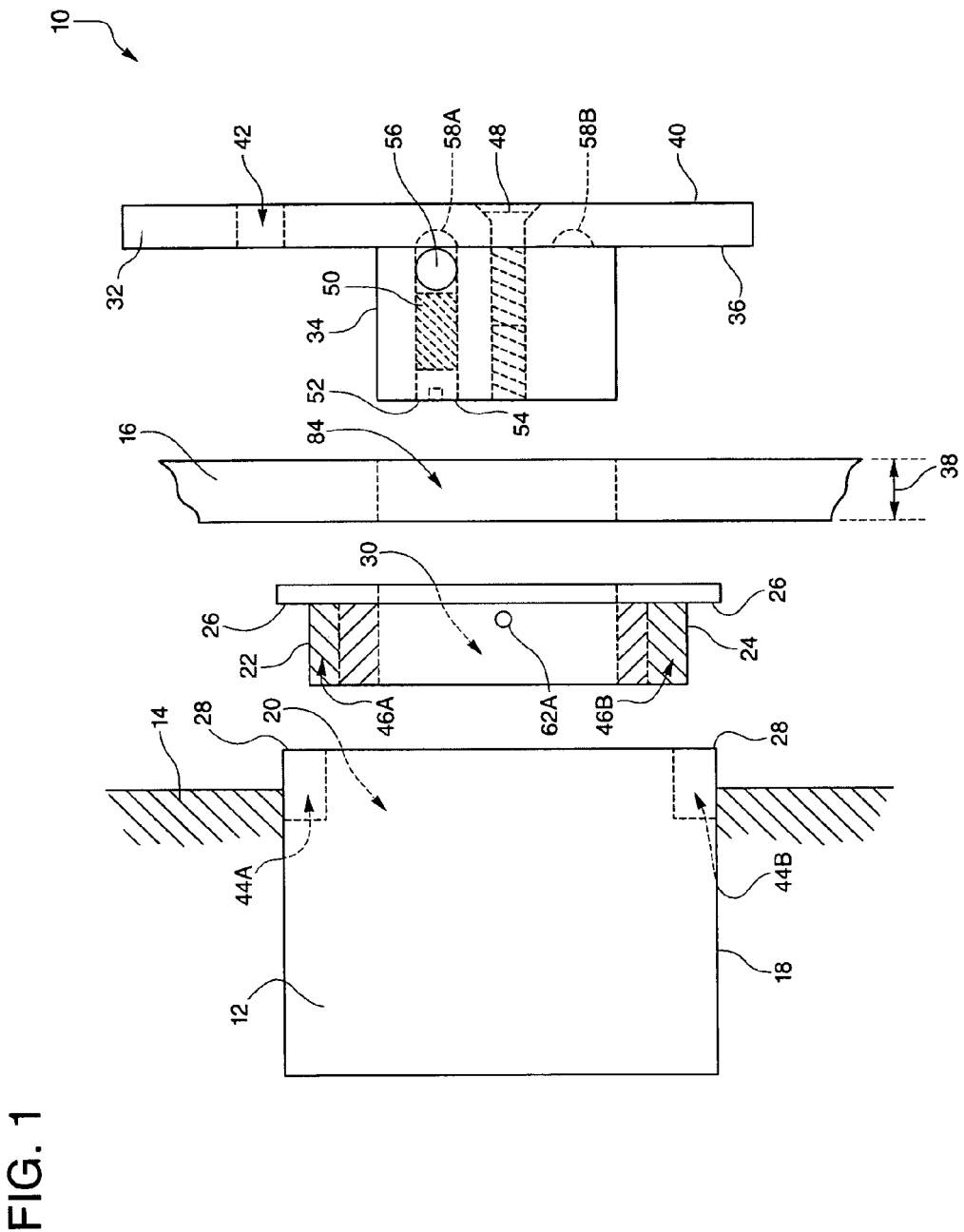
FIG. 1 is an exploded, side plan view of a cut-out tool for making a utility receptacle cut-out in a sheeting material of the present invention showing a utility receptacle secured to a support stud, and an adaptor insert and exterior template of the cut-out tool.

Referring to the drawing in detail, a cut-out tool for making a utility receptacle cut-out in sheeting material is shown in FIG. 1, and is generally represented by the reference numeral 10. As shown in FIG. 1, a utility receptacle, such as an electrical utility receptacle 12, is secured to a structural support 14 such as a strut 14 to which a section of sheeting material 16 is to be secured. The utility receptacle 12 includes a plurality of interconnected walls 18 that define a receptacle chamber 20 between the walls 18.

The cut-out tool includes an insert adaptor having a plurality of insert walls 24 configured to correspond with the plurality of interconnected walls 18 of the receptacle 12 so that the walls 24 of the insert adaptor 22 may be supported within the receptacle chamber 20 adjacent the receptacle walls 18. The insert adaptor 22 defines a mounting shoulder 26 that is secured to the insert walls 24 and is configured to overlie a perimeter edge 28 of the utility receptacle 12 to prevent the insert adaptor 22 from passing completely into the receptacle chamber 20. A mounting sleeve 30 is also defined within the insert adaptor 22 and between the insert walls 24.

Figure 2:
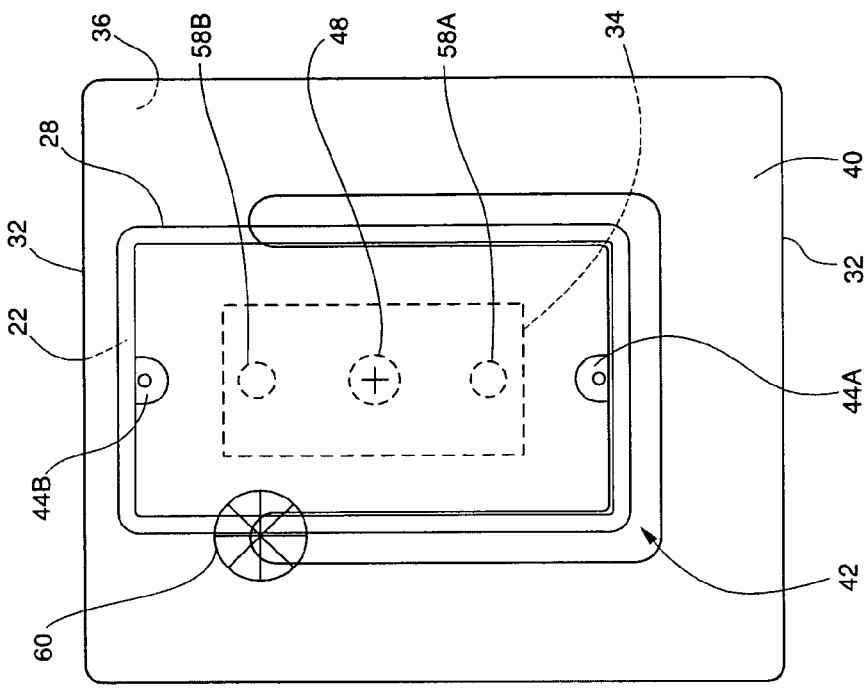
FIG. 2 is a front, plan view of the cut-out tool of the present invention showing an exterior template in a first position so that a cutting slot defined within the template substantially overlies at least one-half of an exterior perimeter of a utility receptacle.
Figure 3:
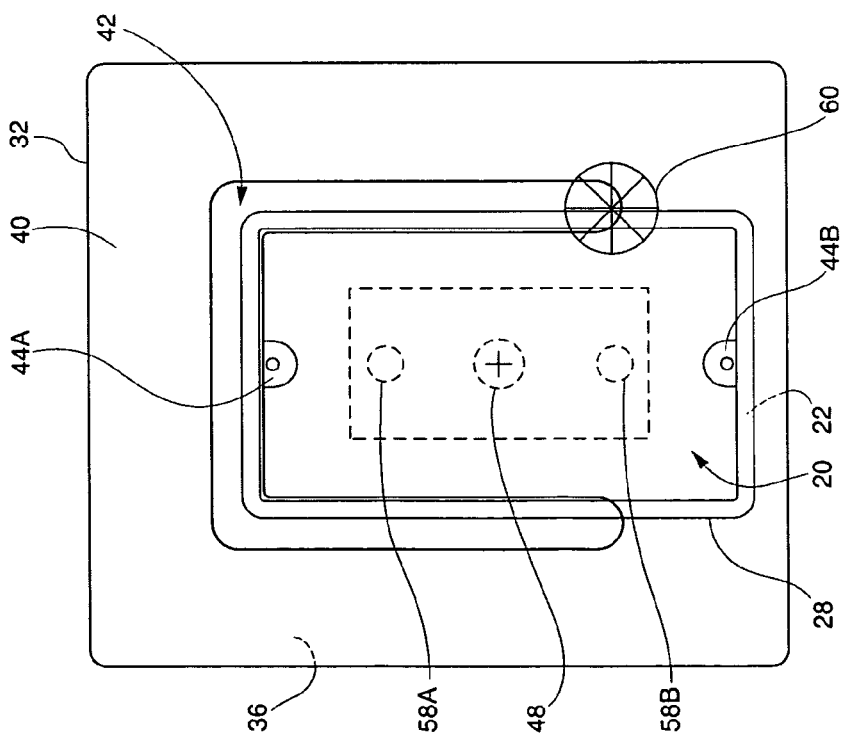
FIG. 3 is a front, plan view of the FIG. 2 cut-out tool showing the exterior template rotated one-hundred and eighty degrees so that the cutting slot substantially overlies a remaining one-half of the exterior perimeter of the utility receptacle.

The cut-out tool 10 also includes an exterior template 32 that has a mounting post 34 configured to extend beyond a mounting surface 36 of the template 32 a distance that is greater than a thickness 38 of the sheeting material 16. The mounting post 34 is configured to be received in and secured by the mounting sleeve 30 of the insert adaptor 22. The exterior template 32 also includes a cutting surface 40 (shown in FIGS. 1, 2 and 3), and the cutting surface 40 defines a cutting slot 42 passing completely through the template 32. As best shown in the sequence of FIGS. 2 and 3, the cutting slot 42 is configured so that whenever the mounting post 34 is secured within the mounting sleeve 30 of the insert adaptor 22, the cutting slot 42 substantially and contiguously overlies the at least one-half of the exterior perimeter 28 of the interconnected walls 18 of the utility receptacle 12. (By the word "substantially", it is meant that the width of the cutting slot is at least about one-quarter inch and extends beyond the exterior perimeter in a direction away from the receptacle chamber 20 a distance of about at least three-eighths inch. By the word "contiguously", it is meant that the cutting slot 42 defines an uninterrupted void over more than one-half of the exterior perimeter 28 of the receptacle 12.)

As shown in FIG. 1, the utility receptacle may define screw-hole extensions 44A, 44B within the receptacle chamber 20, and the walls 24 of the insert adaptor 22 may define corresponding slots 46A, 46B that fit around the screw-hole extensions 44A, 44B. Also shown in FIG. 1 is a preferred embodiment of the exterior template 32, wherein the mounting post 34 is pivotally secured to the mounting surface 36 of the template 32. A pivot screw 48 may be utilized to secure the mounting post 34 to the mounting surface 36, and an alignment guide means may be utilized to make sure the mounting surface pivots precisely one-hundred and eighty degrees, as shown in FIGS. 2 and 3. The alignment guide means may be any guide apparatus capable of performing the described function, such as overlapping lines (not shown) wherein the exterior template is made of clear plastic. Alternatively, the alignment guide means may include an alignment guide spring 50 within an alignment cylinder 52 secured by an alignment screw 54 to force an alignment ball 56 into one of two alignment recesses 58A, 58B defined within the mounting surface 36 of the exterior template 32 (as shown best in FIG. 1).

FIGS. 2 and 3 show use of the exemplary exterior template 32 having a pivotable mounting post 34. In FIG. 2, the exterior template 32 is positioned so that the cutting slot 42 overlies an upper one-half of the perimeter edge 28 of the utility receptacle 12. In FIG. 3, the cutting slot 42 is positioned to overlie a lower one-half of the perimeter edge 28 by rotating the mounting surface 36 of the exterior template 32 one-hundred and eighty degrees. As described above, this preferred embodiment provides for a complete template cut surrounding the perimeter edge 28 of the utility receptacle 12 without having to remove the mounting post 34 from the insert adaptor 22. FIGS. 2 and 3 also show in a cross-line circle a schematic representation of a position of a router coupling 60 to emphasize rotation of the template 32 between FIGS. 2 and 3. Also shown in FIGS. 2 and 3 are the screw hole protrusions 44A, 44B, the pivot screw 48, and the alignment recesses 58A, 58B.

Figure 4C:
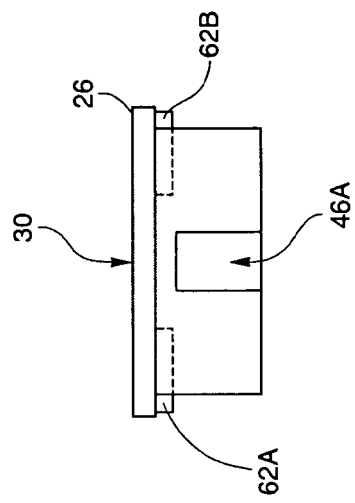
FIG. 4C is an end, plan view of the FIG. 4A open insert adaptor.
Figure 4B:
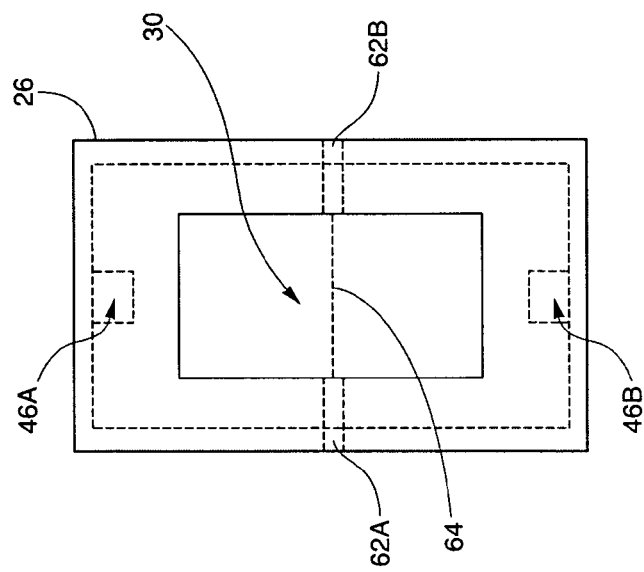
FIG. 4B is a front, plan view of the FIG. 4A open insert adaptor.
Figure 4A:
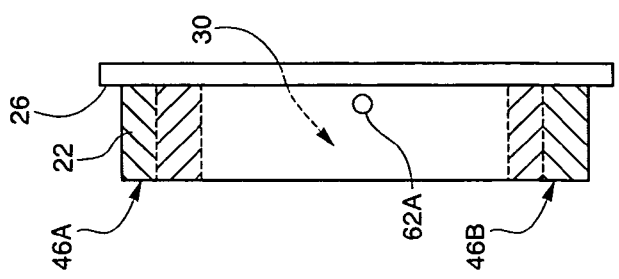
FIG. 4A is a side plan view of an open insert adaptor of the present invention.

FIGS. 4A, 4B, 4C, show the FIG. 1 insert adaptor 22 in a side view in FIG. 4A, in a front plane view in FIG. 4B, and in an end plane view in FIG. 4C. As is apparent, the insert adaptor 22 of FIGS. 4A-4C is an open adaptor, wherein the mounting sleeve 30 has no base, leaving the adaptor 22 in essentially "doughnut" overall form. Such an open insert adaptor 22 provides for efficiencies of manufacture and facility in being used with mounting posts 34 of various sized exterior templates. Also shown in FIGS. 4A-4C in FIG. 1 are pivot pins 62A, 62B protruding from the mounting shoulder 26. As described above, the pivot pins 62A, 62B are dimensioned to rest upon the perimeter edge 28 of the utility receptacle 12 about mid-way between a top and bottom of the receptacle 12 to thereby define a pivot axis 64 for the insert adaptor 22. The pivot axis 64 would be about parallel to a plane defined by surfaces of the sheeting material 16, and parallel to a mounting axis that represents a point of initial attachment (not shown) of the sheeting material 16 to the support stud 14. For example, if the support stud 14 is a vertical frame stud in a standard wall (not shown), and the sheeting material 16 is first secured to a beam perpendicular to a top of the stud 14 so that the sheeting material extends from the top beam downward and over the utility receptacle 12, then the mounting axis would be parallel to the beam and perpendicular to a top of the stud 14.

FIGS. 5A-5C show a closed insert adaptor 66 having a base 68 at an end of the adaptor 66 opposed to the end of the adaptor 66 to which the mounting shoulder 26' is secured. All other components of the closed adaptor 66 are the same as the open adaptor 22 shown in FIGS. 1, 4A-4C, and are represented in FIGS. 5A-5C by primes (e.g., 30') of the same reference numerals in FIGS. 4A-4C. A closed insert adaptor 66 having a base 68 provides for enhanced safety by prohibiting any cutting tool, such as a router bit, from contacting wires, etc. during use of the adaptor 66.

Figure 6:
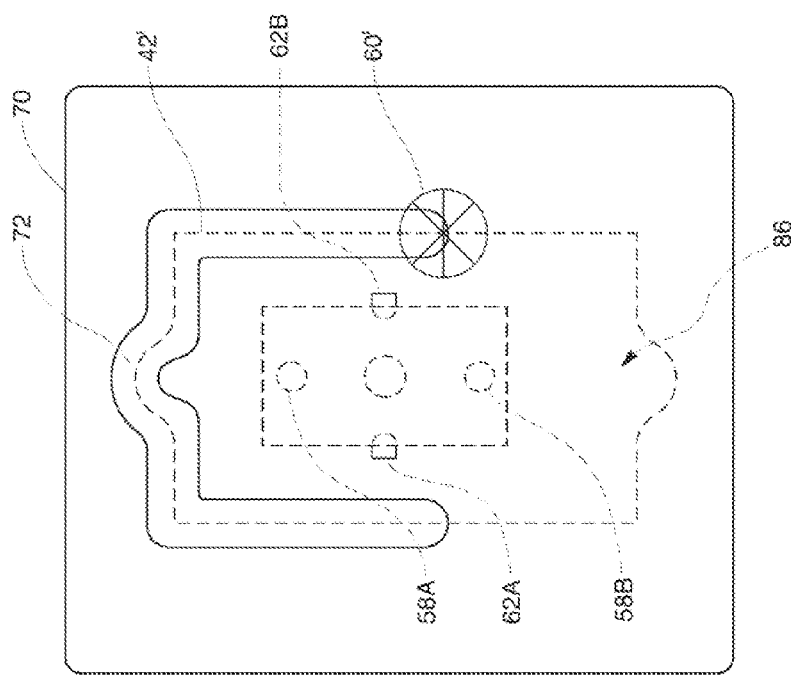
FIG. 6 is a front, plan view of an exterior template showing a screw-hole extension defined within the cutting slot.

FIG. 6 shows an alternative embodiment of an exterior template 70, wherein the cutting slot 42' includes a screw-hole extension 72. The screw-hole extension 72 is configured to permit cutting a template hole around an exterior screw-hole defined on an exterior perimeter of a utility receptacle 12, such as is common with metal utility receptacles (not shown specifically).

Figure 7:
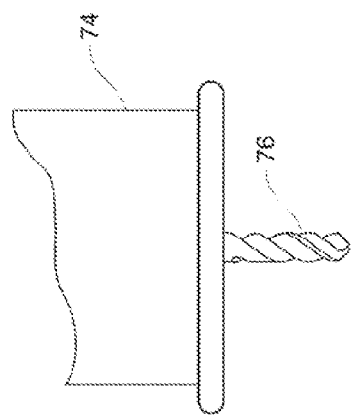
FIG. 7 is a fragmentary, side view of an exemplary router bit that may be utilized to cut a first hole through a section of sheeting material and within a mounting sleeve of the insert adaptor.
Figure 8:
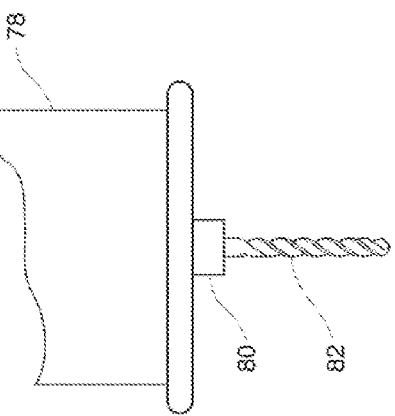
FIG. 8 is a fragmentary, side view of a special router bit having a pilot guide to facilitate cutting of a template hole through a cutting slot of an exterior template and through a section of sheeting material to define a template hole.

FIG. 7 shows a router coupling 74 from which a router bit 76 extends, which represents a standard cutting tool for cutting "sheetrock" type of sheeting material 16. As is apparent, lateral movement of the coupling 74 will expose the bit 76 to possible contact with the receptacle wall 18, which will rapidly dull the bit 76, because the receptacle 12, especially a metal utility receptacle, is invariably made of a material much harder than most sheeting material 16. The coupling 74 and bit 76 of FIG. 7 therefore, are appropriate for cutting sheeting material adjacent the mounting sleeve of the insert adaptor 22 wherein the bit 76 is limited to not cutting beyond the mounting sleeve 30, 30'. This will minimize exposure of the bit 76 to the receptacle 12 walls 18. FIG. 8 shows an alternative coupling 78 from which a protective pilot sleeve 80 extends, and which surrounds another router bit 82. The pilot sleeve 80 is dimensioned to have a diameter slightly less than a width across the cutting slot 42 of the exterior template 32. The pilot sleeve 80 therefore guides the cutting router bit 82 as it makes a template cut adjacent the cutting slot 42, and the pilot sleeve 80 protects the router bit 82 from damage by contacting the walls 18 of the utility receptacle 12. A combination of the FIG. 1 insert adaptor 22, exterior template 32 and the FIGS. 7 and 8 router bits 76, 82 and pilot sleeve 80 represent an alternative embodiment of the invention 10 that enhances efficient use of the cut-out tool 10.

In use of the present cut-out tool 10, prior to securing the sheeting material 16 to the support stud 14, the insert adaptor 22 is secured within the utility receptacle 12 that the sheeting material 16 is to overlie and then an approximate position of the receptacle 12 under the sheeting material 16 is marked on the sheeting material 16. Then, after the sheeting material 16 is secured to the support stud 14 and overlies the receptacle 12, an insert hole 84 (shown in FIG. 1) is cut at the marked location on the sheeting material 16, and the insert hole 84 is expanded so that a perimeter of the insert hole 84 is adjacent a perimeter of the mounting sleeve 30 within the insert adaptor 22. Then, the mounting post 34 of the exterior template 32 is secured within the mounting sleeve 30 so that the mounting surface 36 of the template 32 abuts the sheeting material 16 over the receptacle 12. Then, a template hole 86 (shown in FIG. 6) is cut in the sheeting material 16 adjacent the cutting slot 42 defined within the cutting surface 40 of the exterior template 32. The template 32 may be pulled out of the insert adaptor 22, rotated one-hundred and eighty degrees, and then re-inserted into the insert adaptor 22, so that the cutting slot 42 then overlies a portion of the exterior perimeter 28 of the utility receptacle 12 that has not yet been cut. The template hole 86 is then completed by cutting along the cutting slot 42 so that the template hole 86 in the sheeting material 16 contiguously and substantially overlies the exterior perimeter 28 of the utility receptacle 12. This allows the sheeting material 16 to move over the utility receptacle 12 to abut the support stud 14. As described above, in cutting the insert hole 84, the first router coupling 74 and router bit 76 shown in FIG. 7 may be used, while the second router coupling 78 with its attached pilot sleeve 80 and bit 82 may be used to cut the template hole 86 to further enhance efficiencies of using the instant cut-out tool 10.

Use of the cut-out tool 10 produces very clean cut-outs or template holes 86 by use of the insert adaptor 22 with the exterior template 32 as described above. The insert adaptor 22 provides for a relatively narrow mounting post 34 which in turn provides for an effective cutting slot 42 that can be defined an adequate distance away from the mounting post 34 to provide for consistently clean cut-outs 86. However, an alternative embodiment of the cut-out tool 10 also provides for relatively clean cut-outs without a need for the insert adaptor 22. Instead, the mounting post 34 is simply configured to be secured within the receptacle chamber 20 by abutment against at least two opposed receptacle walls 18. In use of this exterior template 32 embodiment of the cut-out tool 10, the sheeting material 16 is placed adjacent the utility receptacle 12, and a hole is simply cut through the sheeting material 16 that corresponds to the interior of the perimeter edge 28 of the receptacle 12. Then, the sheeting material within that hole is removed, and the mounting post 34 of the exterior template 32 is inserted into the receptacle chamber 20. Next, the cut-out or template hole 86 may be cut through use of the cutting slot 42 in the exterior template 32, as described above. While efficient, this exterior template 32 embodiment of the cut-out tool 10 requires an extremely precise cut within the receptacle chamber 20, and because the cut through the cutting slot 42 is so close to the original cut adjacent the receptacle walls 18, this embodiment increases a risk of damage to the sheeting material 16 adjacent the cut-out or template hole 86.

While the present cut-out tool 10 has been disclosed with respect to the described and illustrated embodiments, it is to be understood that the invention is not to be limited to those embodiments. For example, while standard two-outlet or two-switch electrical utility receptacles are common, the cut-out-tool may be dimensioned to work with any sized or shaped cut-out required in sheeting material, including wall lighting cut-outs, plumbing cutouts, etc. Additionally, while the phrase "plurality of interconnected walls 18" is used to describe the vast majority of the shapes of utility receptacles, that phrase as used herein is also to mean curved walls and in some circumstances may also mean and include a circular-shaped utility receptacle into which circular shaped insert walls of an insert adaptor would be secured. Accordingly, reference should be made primarily to the following claims rather than the foregoing description to determine the scope of the invention.

What is claimed is:

1. A cut-out tool (10) for making a utility receptacle (12) cut-out in sheeting material (16) that is to be secured to a structural support (14) to which the utility receptacle (12) is secured, the utility receptacle (12) including a plurality of interconnected walls (18) defining a receptacle chamber (20) between the walls (18), the cut-out tool (10) comprising:
   a. an exterior template (32) having a mounting post (34) to extend beyond a mounting surface (36) of the template (32) a distance greater than a thickness (38) of the sheeting material (16) and configured to be received within the receptacle chamber (20) and secured by the interconnected walls (18) of the utility receptacle (12), said template has a perimeter larger than a perimeter of the utility receptacle, the template (32) also including a cutting surface (40) opposed to the mounting surface (36) of the template (32), the cutting surface (40) defining a cutting slot (42) passing completely through the template (32) and, whenever the mounting post (34) of the template (32) is secured within the receptacle chamber (20) of the utility receptacle (12), the cutting slot (42) being configured to substantially and contiguously overlie at least one-half of an exterior perimeter (28) of the utility receptacle (12); and,
   b. wherein the exterior template (32) includes an alignment guide apparatus (50), (52), (54), (56), (58A), (58B) configured to guide one-hundred and eighty degree pivoting of the mounting surface (36) of the exterior template (32) relative to the mounting post (34), the alignment guide apparatus comprising an alignment guide spring (50) within an alignment cylinder (52) secured by an alignment screw (54) to force an alignment ball (56) into one of two alignment recesses (58A, 58B) defined within the mounting surface (36) of the exterior template (32).

2. The cut-out tool of claim 1, wherein the cutting slot (42) defines a screw-hole extension (72).

3. A cut-out tool (10) for making a utility receptacle (12) cut-out in sheeting material (16) that is to be secured to a structural support (14) to which the utility receptacle (12) is secured, the utility receptacle (12) including a plurality of interconnected walls (18) defining a receptacle chamber (20) between the walls (18), the cut-out tool (10) comprising:
   a. an insert adaptor (22) having a plurality of insert walls (24) configured to be inserted into the receptacle chamber (20) adjacent the interconnected receptacle walls (18), a mounting shoulder (26) secured to the insert walls (18) and configured to overlie a perimeter edge (28) of the utility receptacle (12) to prevent the insert adaptor (22) from passing completely into the receptacle chamber (20), the mounting shoulder (26) defining a mounting sleeve (30) between the insert walls (24);
   b. an exterior template (32) having a mounting post (34) configured to extend beyond a mounting surface (36) of the template (32) a distance greater than a Thickness (38) of the sheeting material (16) and configured to be received and secured by the mounting sleeve (30) of the insert adaptor (22), said template has a perimeter larger than a perimeter of the mounting shoulder, the template (32) also including a cutting surface (40) opposed to the mounting surface (36) of the template (32), the cutting surface (40) defining a cutting slot (42) passing completely through the template (32) and, whenever the mounting post (34) of the template (32) is secured within the mounting sleeve (30) of the insert adaptor (22), the cutting slot (42) being configured to substantially and contiguously overlie at least one-half of the exterior perimeter (28) of the utility receptacle (12); and,
   c. wherein the insert adaptor (22) further comprises a pair of pivot pins (62A), (62B) projecting outwardly from the mounting sleeve adjacent the mounting shoulder (26) of the insert adaptor (22) and configured to rest upon the exterior perimeter (28) of the utility receptacle (12) about mid-way between a top and bottom of the receptacle (12) to thereby define a pivot axis (64) about which the insert adaptor (22) pivots to permit flush mounting of the insert adaptor (22) to the sheeting material (16) during use of the insert adaptor (22).

4. The cut-out tool of claim 3, wherein the exterior template (32) includes an alignment guide apparatus (50), (52), (54), (56), (58A), (58B) configured to guide one-hundred and eighty degree pivoting of the mounting surface (36) of the exterior template (32) relative to the mounting post (34).

5. The cut-out tool of claim 4, wherein the alignment guide apparatus comprises an alignment guide spring (50) within an alignment cylinder (52) secured by an alignment screw (54) to force an alignment ball (56) into one of two alignment recesses (58A, 58B) defined within the mounting surface (36) of the exterior template (32).

6. The cut-out tool of claim 3, wherein the cutting slot (42) defines a screw-hole extension (72).

7. A cut-out tool (10) for making a utility receptacle (12) cut-out in sheeting material (16) that is to be secured to a structural support (14) to which the utility receptacle (12) is secured, the utility receptacle (12) including a plurality of interconnected walls (18) defining a receptacle chamber (20) between the walls (18), the cut-out tool (10) comprising:
   a. an insert adaptor (22) having a plurality of insert walls (24) configured to be inserted into the receptacle chamber (20) adjacent the interconnected receptacle walls (18), a mounting shoulder (26) secured to the insert walls (18) and configured to overlie a perimeter edge (28) of the utility receptacle (12) to prevent the insert adaptor (22) from passing completely into the receptacle chamber (20), the mounting shoulder (26) defining a mounting sleeve (30) between the insert walls (24);
   b. an exterior template (32) having a mounting post (34) configured to extend beyond a mounting surface (36) of the template (32) a distance greater than a thickness (38) of the sheeting material (16) and configured to be received and secured by the mounting sleeve (30) of the insert adaptor (22), said template has a perimeter larger than a perimeter of the mounting shoulder, the template (32) also including a cutting surface (40) opposed to the mounting surface (36) of the template (32), the cutting surface (40) defining a cutting slot (42) passing completely through the template (32) and, whenever the mounting post (34) of the template (32) is secured within the mounting sleeve (30) of the insert adaptor (22), the cutting slot (42) being configured to substantially and contiguously overlie at least one-half of the exterior perimeter (28) of the utility receptacle (12); and,
   c. wherein the exterior template (32) includes an alignment guide apparatus (50), (52), (54), (56), (58A), (58B) configured to guide one-hundred and eighty degree pivoting of the mounting surface (36) of the exterior template (32) relative to the mounting post (34), the alignment guide apparatus comprising an alignment guide spring (50) within an alignment cylinder (52) secured by an alignment screw (54) to force an alignment ball (56) into one of two alignment recesses (58A, 58B) defined within the mounting surface (36) of the exterior template (32).

8. The cut-out tool of claim 7, wherein the cutting slot (42) defines a screw-hole extension (72).

9. A cut-out tool (10) for making a utility receptacle (12) cut-out in sheeting material (16) that is to be secured to a structural support (14) to which the utility receptacle (12) is secured, the utility receptacle (12) including a plurality of interconnected walls (18) defining a receptacle chamber (20) between the walls (18), the cut-out tool (10) comprising:
  a. an insert adaptor (22) having a plurality of insert walls (24) configured to be inserted into the receptacle chamber (20) adjacent the interconnected receptacle walls (18), a mounting shoulder (26) secured to the insert walls (18) and configured to overlie a perimeter edge (28) of the utility receptacle (12) to prevent the insert adaptor (22) from passing completely into the receptacle chamber (20), the mounting shoulder (26) defining a mounting sleeve (30) between the insert walls (24);
  b. an exterior template (32) having a mounting post (34) configured to extend beyond a mounting surface (36) of the template (32) a distance greater than a Thickness (38) of the sheeting material (16) and configured to be received and secured by the mounting sleeve (30) of the insert adaptor (22), said template has a perimeter larger than a perimeter of the mounting shoulder, the template (32) also including a cutting surface (40) opposed to the mounting surface (36) of the template (32), the cutting surface (40) defining a cutting slot (42) passing completely through the template (32) and, whenever the mounting post (34) of the template (32) is secured within the mounting sleeve (30) of the insert adaptor (22), the cutting slot (42) being configured to substantially and contiguously overlie at least one-half of the exterior perimeter (28) of the utility receptacle (12); and,
  c. a router coupling (78) supporting a bit (82) and having a pilot Sleeve (80) surrounding the bit (82) adjacent the coupling (78), wherein the pilot sleeve (80) is dimensioned to have a diameter slightly less than a width across the cutting slot (42) of the exterior template (32) to guide the bit (82) through the cutting slot (42) without contacting the receptacle walls (18).

10. The cut-out tool of claim 9, wherein the exterior template (32) includes an alignment guide apparatus (50), (52), (54), (56), (58A), (58B) configured to guide one-hundred and eighty degree pivoting of the mounting surface (36) of the exterior template (32) relative to the mounting post (34).

11. The cut-out tool of claim 10, wherein the alignment guide apparatus comprises an alignment guide spring (50) within an alignment cylinder (52) secured by an alignment screw (54) to force an alignment ball (56) into one of two alignment recesses (58A, 58B) defined within the mounting surface (36) of the exterior template (32).

12. The cut-out tool of claim 9, wherein the cutting slot (42) defines a screw-hole extension (72).

\* \* \* \* \*